Jan. 4, 1966 LA VERGNE L. SMITH 3,227,177
FUEL VALVE MEANS FOR ROCKET MOTOR
Filed Nov. 6, 1961 4 Sheets-Sheet 1

INVENTOR:
LaVergne L. Smith
By Smyth, Roston & Pavitt
Attorneys

Jan. 4, 1966  LA VERGNE L. SMITH  3,227,177
FUEL VALVE MEANS FOR ROCKET MOTOR
Filed Nov. 6, 1961  4 Sheets-Sheet 3

INVENTOR:
LaVergne L. Smith

Attorneys

Jan. 4, 1966    LA VERGNE L. SMITH    3,227,177
FUEL VALVE MEANS FOR ROCKET MOTOR
Filed Nov. 6, 1961    4 Sheets-Sheet 4

INVENTOR:
LaVergne L. Smith

Smyth, Roston & Pavitt
Attorneys

United States Patent Office 3,227,177
Patented Jan. 4, 1966

3,227,177
FUEL VALVE MEANS FOR ROCKET MOTOR
La Vergne L. Smith, Reseda, Calif., assignor to Whittaker Corporation, a corporation of California
Filed Nov. 6, 1961, Ser. No. 150,542
14 Claims. (Cl. 137—625.4)

This invention relates to the injection of fluids into a chamber for combustion therein and is directed specifically to the problem of providing controlled synchronized injection of two separate fluids. The invention is applicable to various kinds of combustion chambers for such uses as gas generation and may be applied to various kinds of engines including both turbines and reciprocating engines. The invention has special utility, however, for rocket engines and particularly rocket engines used for attitude control of space vehicles.

By way of example and to illustrate the principles involved, the present disclosure is directed to such a guidance engine employing two propellants. It is further assumed for the purpose of illustration that the guidance engine uses hypergolic fuels but it is to be understood that non-hypergolic propellants may be used in various practices of the invention. Such a guidance device is typically commanded by an automatic guidance system, the two propellant liquids being released for periods of thrust as required to cause changes in attitude of the space vehicle.

Ideally, the guidance thrust that is commanded by a guidance system should be of constant magnitude and the periods of thrust should coincide precisely with the time periods of the command signals. For a number of reasons, however, this ideal cannot be attained with a conventional bipropellant rocket engine.

An inherent difficulty resides in the necessity of using valves to control the two fluids. An initial time lag at the beginning of a command signal is required for the two valves to open, as well as for inertia of the two fluids to be overcome and for ignition to occur. At the end of a command signal a time lag is required for the valves to close.

Since a guidance system can be designed to compensate for short time lags, it would seem that the problem of accurate guidance could be solved simply by using snap-acting valves to minimize the delays. In practice, however, merely using snap-acting valves in a conventional bipropellant rocket engine does not solve the problem because while the time lags are shortened they are not constant as required to make a sensitive guidance system operate with acceptable accuracy.

It has been found that one further difficulty in the operation of a conventional bipropellant rocket engine is that the release of the two fluids is not synchronized when measured in milliseconds or fractions thereof as required for accurate guidance control. With the greatest of care it is impossible to design two separate valves for absolute synchronization.

It has been further found that when a bipropellant rocket engine of conventional design is used for short bursts of guidance thrust, the character and duration of the thrusts vary with the time intervals between thrusts. Research reveals that the cause of the errant behavior is in the presence of residual fluids in the fluid passages between the two valves and the combustion chamber after the two valves close. Since the two residual fluids dissipate in time, they are not present when a guidance thrust is commanded after a relatively long idle period. If a guidance thrust is initiated after only a short idle period, however, the residual fluid shortens the lag between the initiation of the command signal and the initiation of the guidance thrust and, in addition, increases the total thrust exerted in a given command signal period. Conversely, in the absence of such residual fluids, the initial rise in thrust is more gradual and the total thrust exerted in a given short time period is less.

The present invention is directed to the problem of eliminating guidance variations that are caused both by lack of synchronism in the operation of the two valves and by the presence of residual fluid. Broadly described, the invention serves its purpose by substituting an integral dual flow valve for the usual two separate valves and by close coupling the dual valve to the combustion chamber to eliminate the usual intervening passage spaces where residual unconsumed propellants are trapped.

The invention further includes the solution for certain problems that arise in carrying out this basic concept of employing a close coupled dual valve. The most serious problem is to avoid overheating of the dual valve by the closely adjacent combustion chamber. The invention solves this problem primarily by designing the valve for coaxial flow with the oxidizer fluid streaming through an annular passage that surrounds an axial passage for the fuel. Thus the oxidizer fluid serves as a coolant for the fuel fluid when the two fluids approach the immediate vicinity of the combustion chamber.

The invention incurs another problem in that a dual valve that is close coupled to the combustion chamber releases the two fluids for intermixture close to the sealing or working surfaces of the valve. Consequently, combustion occurs close to the sealing surfaces to cause deterioration of the surfaces. In one practice of the invention this problem is met by mounting a baffle on a dual valve member with the baffle extending downstream from the valve member to prevent intermixture of the two fluids for an effective distance beyond the cooperating sealing surfaces.

Another problem in some installations is to provide such a close coupled dual valve having a single valve member with simple provision for varying the ratio of the rates at which the two fluids are released. This problem is met by metering one of the bi-propellant fluids at a constant rate regardless of the open position of the valve member and by varying the rate of flow of the other fluid by varying the distance that the valve member retracts from its closed position. Thus adjusting the open position of the valve member adjusts the ratio between the rates of flow of the two fluids.

In this regard, a feature of the invention is the concept of using a snap-acting valve actuator with a given operating stroke for retracting the single valve member from its closed position and of adjusting the stroke to adjust the degree of retraction of the valve member. Thus adjusting the actuating stroke, adjusts the ratio between the two rates of flow. In the initial practice of the invention a torque motor is used to retract the valve member in opposition to a spring and the torque motor is connected to the valve member by a connector member that is adjustable in effective length. For this purpose the connector member is attached to the torque motor by a differential screw means which permits fine adjustments of the ratio between the two rates of flow.

The invention further solves the problem of designing a dual bi-axial valve with a single valve member for synchronous flow of the two fluids. The feature of the invention in this regard is the provision of an annular discharge port and two annular valve seats concentric thereto for cooperation with the single valve member and the further provision of a flow passage through the valve member. One of the two fluids flows around the periphery of the valve member and is cut off from the annular discharge passage by the outer annular valve seat. The other fluid flows through the valve member itself and is cut off from the annular discharge port by the inner annular valve seat.

The features and advantages of the invention may be readily understood from the following detailed description and the accompanying drawings.

In the drawings, which are to be regarded as merely illustrative:

Figure 1:
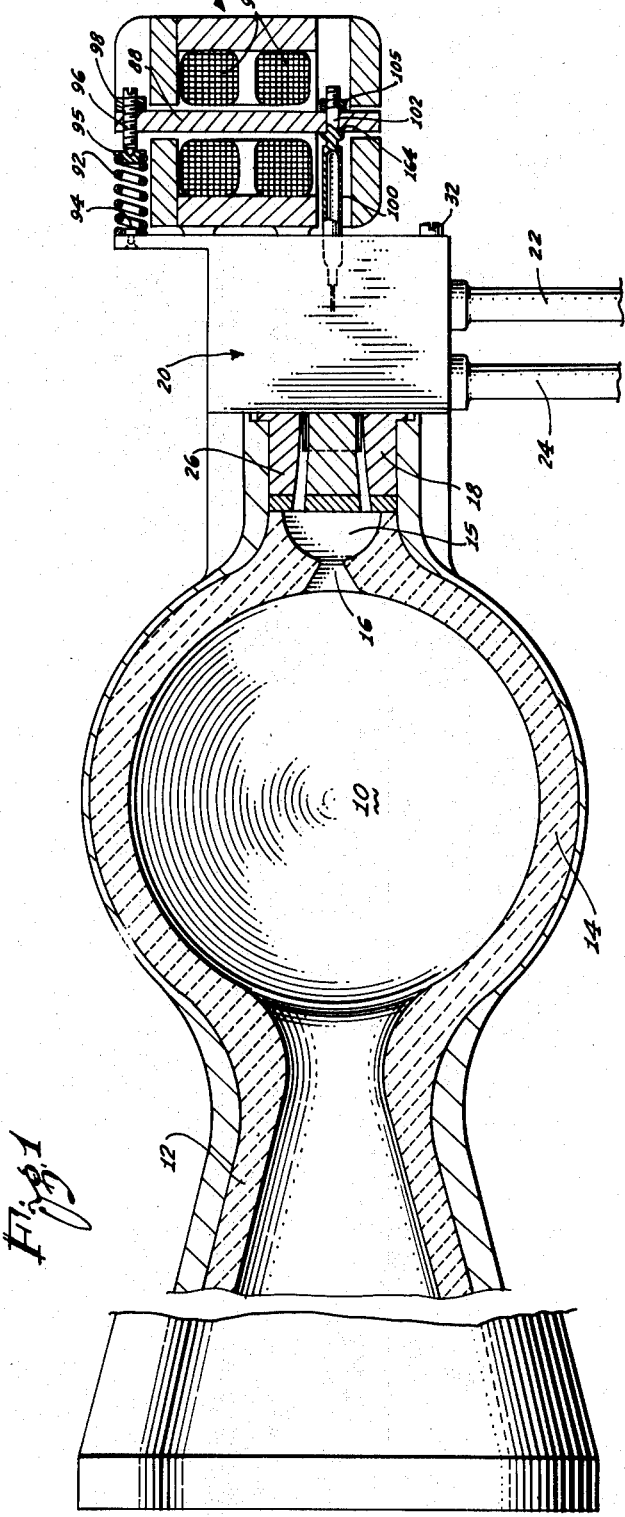
FIG. 1 is a partly sectional and partly elevational view of a bipropellant guidance rocket engine incorporating a selected embodiment of the invention.
Figure 2:
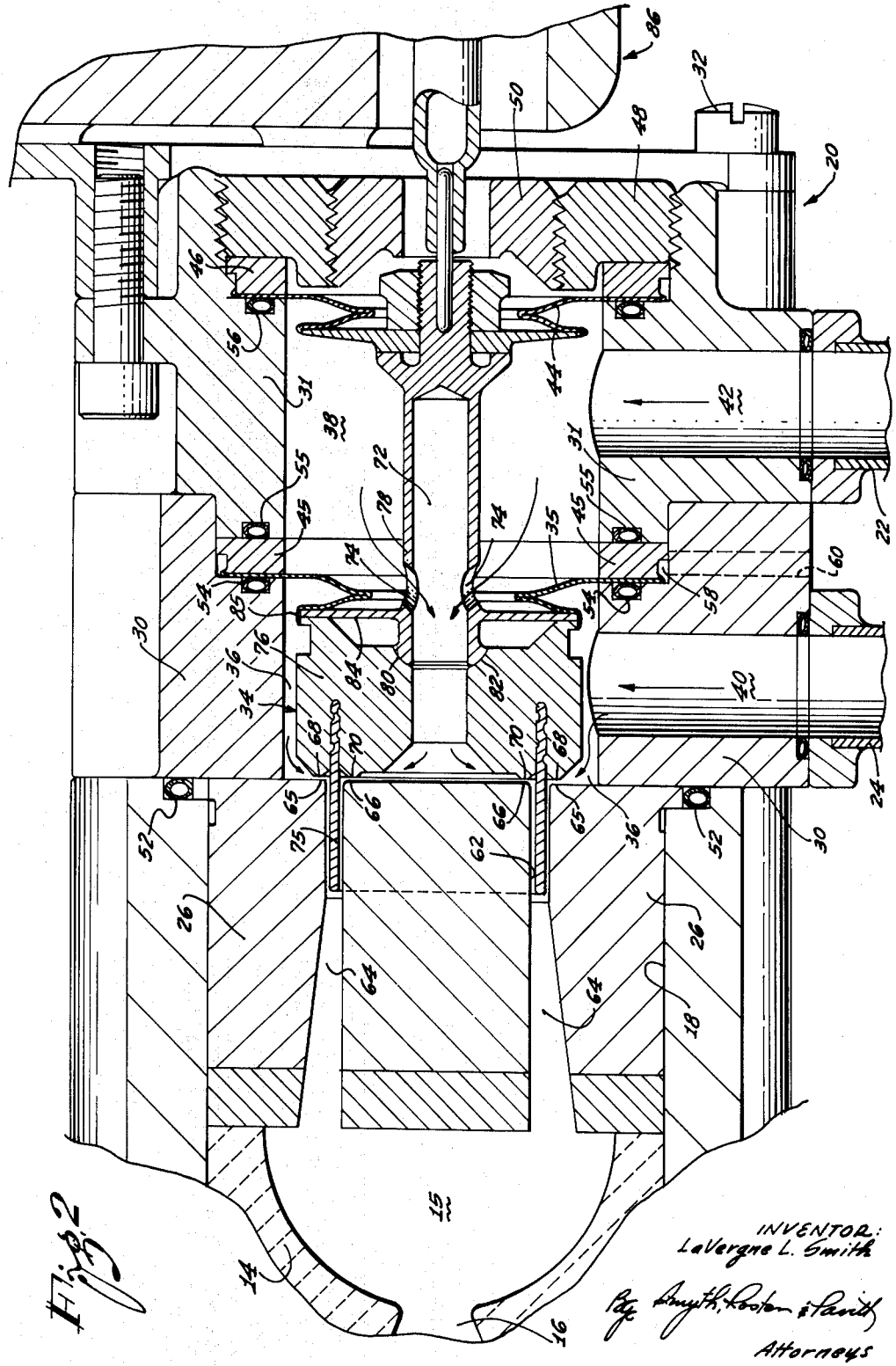
FIG. 2 is an enlarged fragmentary section of FIG. 1.
Figure 3:
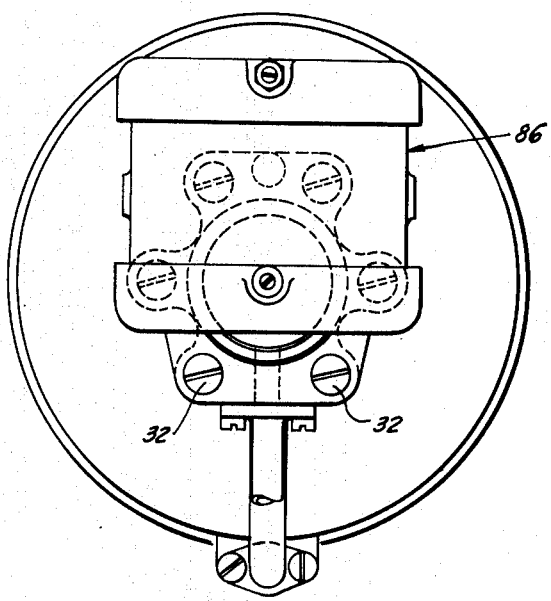
FIG. 3 is a rear end view of the structure shown in FIG. 1.

The first embodiment of the invention shown in FIGS. 1–3 provides a combustion chamber 10 and a flared nozzle 12 both of which are lined with refractory material 14 which serves as a heat barrier. The wall structure of the combustion chamber 10 forms a small precombustion chamber 15 with a flared metering port 16 from the precombustion chamber to the main combustion chamber. The wall structure of the combustion chamber 10 is further formed with a relatively large opening 18 in which a dual valve, generally designated 20 is mounted, the valve serving as the rear wall of the precombustion chamber 15. A fluid fuel, for example hydrazine, is supplied from a suitable pressurized source to the dual valve 20 through a tube 22 and a second tube 24 delivers oxidizer fluid to the dual valve.

The body of the dual valve 20 comprises a plurality of separate sections 26, 30 and 31 which are interconnected and anchored to the combustion chamber 10 by suitable screws 32. The forward body section 26 of the dual valve is telescoped into the opening 18 of the combustion chamber and together with the second body section 30 and the third body section 31 form a cylindrical valve chamber in which an elongated valve member, generally designated 34 is mounted for longitudinal movement. The valve chamber is divided by a movable wall 35 into a forward valve compartment 36 and a rearward valve compartment 38, the forward compartment being in communication with the oxidizer tube 24 through a radial bore 40 and the rearward compartment 38 communicating with the fuel tube 22 through a radial bore 42. A second movable wall 44 forms the rear wall of the rearward valve compartment 38. Both of the movable walls 35 and 44 are metal bellows which are preferred over pistons.

The inner circumferential portion of the forward diaphragm 35 is attached to the valve member 34 and the outer circumferential portion is clamped against the second body section 30 by an inner ring 45. In like manner the inner circumferential portion of the second diaphragm 44 is attached to the valve member and the outer circumferential portion is clamped against the rearward body section 31 by an inner ring 46. The inner ring 46 is secured, in turn, by an internally and externally threaded bushing 48. A second inner bushing 50 threaded into the outer bushing 48 is removable for access to the interior of the dual valve.

A high-temperature sealing ring 52 is provided at the juncture of the combustion chamber 10 with the two valve body sections 26 and 30; a second high-temperature sealing ring 54 is interposed between the first diaphragm 35 and the valve body section 30; a third high-temperature sealing ring 55 is interposed between the inner ring 45 and the valve body section 30; and a fourth high-temperature sealing ring 56 is interposed between the second diaphragm 44 and the valve body section 31.

As indicated in FIG. 2, the assembled valve body forms a circumferential space 58 adjacent the periphery of the diaphragm 35 that separates the oxider and this circumferential space communicates with at least one radial vent passage 60 to the atmosphere. In the event that either of the two fluids leaks past the periphery of the diaphragm, the leaking fluid is released directly to the atmosphere.

The forward body section 26 of the dual valve 34 forms a discharge port in the form of a cylindrical space 62 and a pluarlity of flared bores 64 that extend from the cylindrical space to the precombustion chamber 15. The inner face of the forward valve body section 26 forms an outer annular valve seat 65 which surrounds the entrance into the annular discharge port and further forms an inner annular valve seat 66 which is surrounded by the annular discharge port.

The valve member 34 which is of the poppet type has an outer annular sealing surface 68 on its forward end for sealing contact with the outer annular valve seat 65 and has an inner annular sealing surface 70 for simultaneous sealing contact with the inner annular valve seat 66. To provide a path for fuel flow from the chamber 38 to the inner circumference of the inner annular valve seat 66, the valve member 34 is of tubular construction with an axial passage 72 opening onto its forward end and the valve member is further formed with radial ports 74 for communication between the rearward valve compartment 38 and the axial passage.

The fuel flows from the supply tube 22 into the rearward valve compartment 38 and through the axial passage 72 of the valve member to impinge on the forward valve body section 26 and spread radially to the surrounding inner annular valve seat 66. At the same time oxidizer from the supply tube 40 flows into the valve compartment 36 to envelope the periphery of the valve member 34 to reach the outer circumference of the outer annular valve seat 65. The advantage of this arrangement is that the flowing oxidizer forms a cooling jacket for the axially flowing fuel. Oxidizers in general have much greater thermal stability than fuels, especially fuels such as monopropellants which are capable of thermal decomposition without the aid of a separate oxidizing agent and the cooling effect of the oxidizer keeps such a sensitive fuel from reaching its reaction temperature.

A feature of this embodiment of the invention is that the leading end of the valve member 34 is provided with a fixed forwardly extending cylindrical shroud 75 which extends into the cylindrical space 62 of the outlet port for nearly the full length of the cylindrical space. The cylindrical shroud 75 serves as a baffle to keep the oxidizer fluid and the fuel fluid separate from each other for a substantial distance downstream from the valve seats 65 and 66. This arrangement spaces the zone of combustion far enough away from the sealing surfaces of the dual valve to prevent damage to the sealing surfaces.

The valve member 34 is preferably made in two sections, namely, a forward nose section 76 and a main rearward section 78, the forward section being formed with a concentric spherical seat 80 and the rearward section being formed with a correspondingly spherically curved concentric boss 82 that fits snugly into the seat. This arrangement gives the forward nose section 76 of the valve member freedom for self-alignment with respect to the two annular valve seats 65 and 66. In the construction shown, the two valve member sections 76 and 78 are flexibly interconnected and for this purpose the rearward section is formed with a thin integral radial flange 84 and the periphery of the radial flange is united both with the forward section 76 and the forward diaphragm 35 by means of welding 85.

While any suitable remotely controlled actuator may be employed to move the valve member 34 longitudinally between its closed and open positions, the use of a torque motor is advantageous to operate the valve member with the desired snap action and minimum power consumption. In the construction shown, a torque motor, generally designated 86, has the usual elongated armature 88 surrounded by coils 90. A coil spring 92 of sufficient strength to move the valve member to closed position with a snap action is confined under compression between a fixed spring seat 94 and an adjustable spring seat 95. The adjustable spring seat 95 is mounted on a transverse set screw 96 on one end of the armature 88, the set screw being releasably secured at adjusted positions by a lock nut 98.

The second end of the armature 88 is operatively connected to the valve member 34 in a suitable manner. In the construction shown, a pull rod 100 is employed for this purpose, one end of the pull rod being connected to the valve member 34 axially thereof and the other end extending through a bore 102 of the armature 88 with a flange 104 of the pull rod abutting the armature. A retaining nut 105 is screwed onto the end of the pull rod to cooperate with the flange 104 for fixedly connecting the pull rod to the armature.

Normally, i.e. when the rocket motor is not in operation, the coil spring 92 acting on the armature 88 holds the valve member 34 in its closed position shown in FIG. 1. When the coils 90 of the torque motor are energized, the armature 88 rocks counterclockwise as viewed in FIG. 1 to retract the valve member 34 to an open position, for example, the open position shown in FIG. 2.

The manner in which the first embodiment of the invention functions for its purpose may be readily understood from the foregoing description. Whenever a command signal is initiated in the form of a pulse to the torque motor 86, the valve member 34 opens with a snap action and as soon as the command pulse terminates the valve member closes with similar snap action. Absolute synchronization of flow occurs because the two sealing surfaces of the valve member 34 are integral with each other and are arranged for simultaneous contact with the two corresponding annular seats.

Whenever the dual valve member retracts to an open position in response to the initiation of a command signal, the two fluids are released in proportions determined by the relative diameters of the two valve seats and ignition occurs instantly at the rim of the cylindrical shroud 75. Combustion extends through the flared bores 64 in the precombustion chamber 15 and continues through the calibrated metering port 16 into the combustion chamber 10. One purpose of the precombustion chamber 15 is to serve as a mixing chamber where intermixture of the bipropellants is completed. Another and important purpose of the precombustion chamber 15 in combination with the metering port 16 is to provide a confined but vented space in which the fuel and oxidizer are maintained in sufficiently intimate mutual contact to insure ignition at extreme altitudes where the propellants have a tendency to evaporate with extreme rapidity.

Even though the precombustion chamber is interposed between the dual valve and the main combustion chamber 10, ignition occurs instantly when the dual valve opens and terminates instantly when the dual valve closes. Thus the lag between the initiation of a command signal and the initiation of a guidance thrust is insignificant and the lag between the termination of a guide signal and the termination of the guidance thrust is also insignificant. As a consequence the time duration of the intermittent guidance thrusts are very close to being coextensive with the command signals. When it is further considered that no residual propellant fluids can be trapped when a command signal terminates, it can be appreciated that the guidance thrusts are of uniform character as necessary for precise navigation by a highly sensitive automatic guidance system.

The described construction is further advantageous in avoiding difficulties that might arise from leakage of the bipropellants. In the event that any minute leakage occurs at either of the two annular valve seats, the leakage is vented directly to the atmosphere through the precombustion chamber 15 to prevent any leakage detonations that may damage the valve member and the co-acting sealing surfaces of the valve. In the event that any leakage occurs in the region of the diaphragm 35 that separates the two bipropellants, such leakage is also vented directly to the atmosphere through the radial vent passage 60 to prevent internal detonations that might possibly damage the dual valve.

Figure 4:
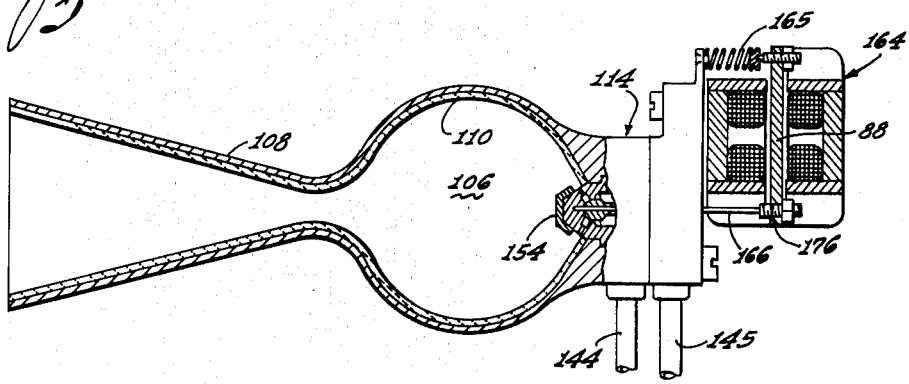
FIG. 4 is a view similar to FIG. 1 illustrating a second embodiment of the invention.
Figure 6:
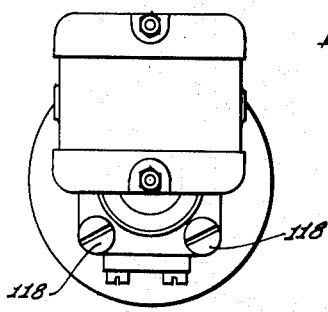
FIG. 6 is a rear elevation of the structure shown in FIG. 4.
Figure 5:
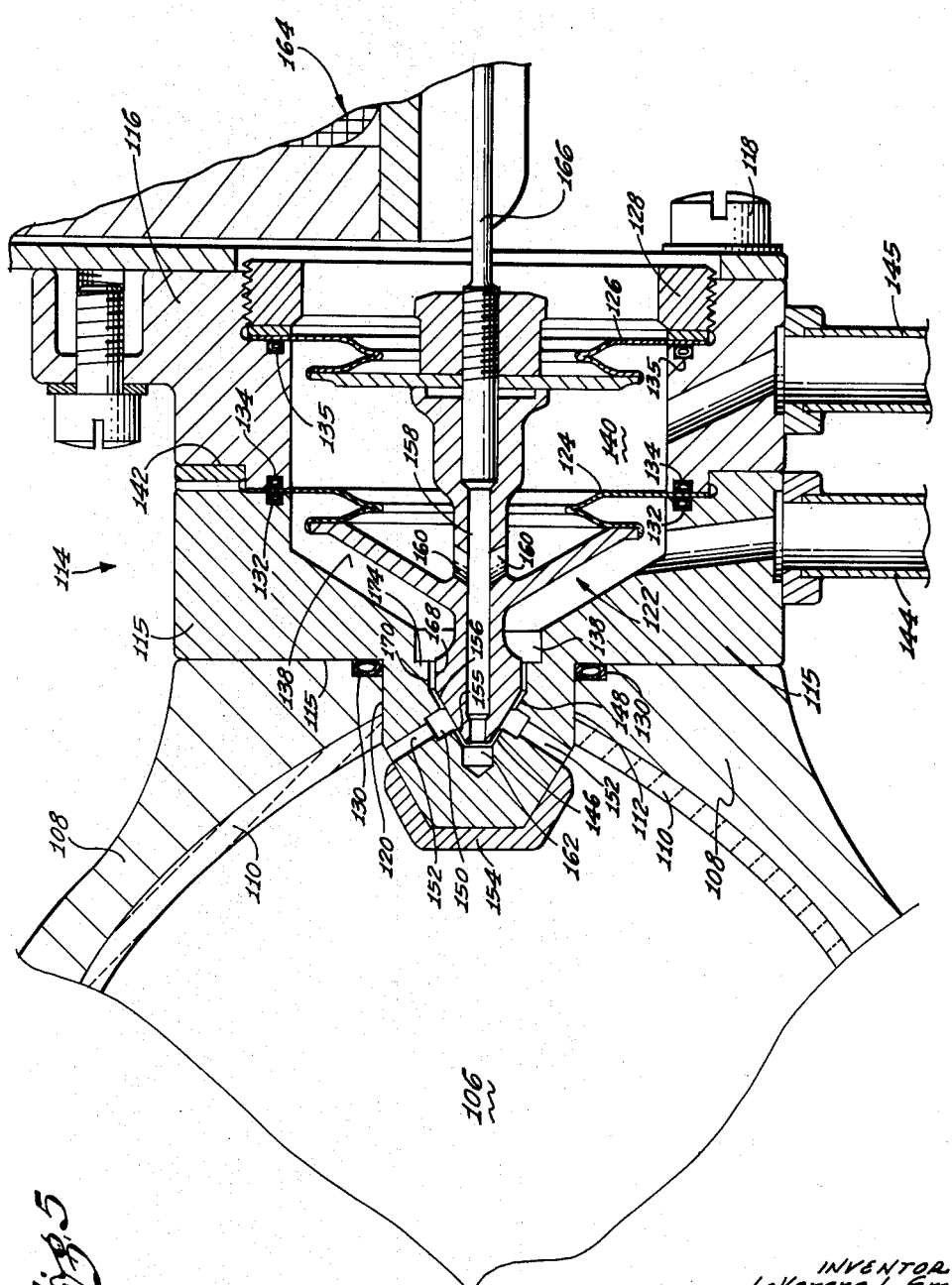
FIG. 5 is an enlarged fragmentary section of FIG. 4.

The rocket engine of the second embodiment of the invention shown in FIGS. 4, 5 and 6 has the usual combustion chamber 106 and a flared nozzle 108, both with a refractory lining 110. The wall structure of the combustion chamber 106 is formed with a circular opening 112 to receive a dual valve that is generally designated by the numeral 114. The body of the dual valve has a forward section 115 and a separate rearward section 116 which are interconnected and attached to the combustion chamber structure by suitable screws 118. The forward valve body section 115 extends through the combustion chamber opening 112 into the interior of the combustion chamber.

A single valve member, generally designated 122 is longitudinally movable inside the chamber that is formed by the valve body sections 115 and 116. The valve member 122 is supported and guided by a forward metal bellows-type diaphragm 124 and a similar rearward diaphragm 126 both of which are connected directly to the valve member. The forward diaphragm 124 is clamped by the two valve body sections 115 and 116 and the rearward diaphragm 126 is clamped to the rear body section 116 by a threaded bushing 128. The assembly of parts is sealed by suitable sealing rings including: a high-temperature sealing ring 130 between the forward valve body section 115 and the wall structure of the combustion chamber 106; a similar sealing ring 132 between the forward valve body section 115 and the diaphragm 124; a similar sealing ring 134 between the forward diaphragm 124 and the rearward valve body section 116; and a similar sealing ring 135 between the rearward valve body section 116 and the bushing 128.

The forward diaphragm 124 divides the valve chamber into a forward valve compartment 138 for the oxidizer and a rearward valve compartment 140 for the fuel and at least one radial vent passage 142 extends from the periphery of the diaphragm directly to the atmosphere. It is to be noted that the sealing ring 132 on one side of the diaphragm 124 blocks leakage of oxidizer from the compartment 138 and the sealing ring 135 on the other side of the diaphragm blocks leakage of fuel from the valve compartment 140.

The forward valve compartment 138 is connected to a tube 144 that supplies oxidizer under pressure, the tube communicating with the valve compartment through a bore in the forward valve body section 115, as shown. A tube 145 for supplying fluid fuel under pressure communicates with the rearward valve compartment 140 through a bore as shown.

As best shown in FIG. 5 the forward end of the forward valve compartment 138 is of tapered or conical configuration and forms both an inner annular valve seat 146 and an outer annular valve seat 148. Between the two tapered annular valve seats 146 and 148 is a discharge port which comprises an annular recess 150 in the valve chamber and a plurality of divergently directed bores 152 from the annular recess to the interior of the combustion chamber 106. The annular recess 150 functions as a precombustion chamber in which ignition occurs. Since the forward valve body section 115 extends into the combustion chamber it is desirable to provide the exposed portion with a heat shield 154. This heat shield may be a bonded layer of a suitable refractory material.

The dual valve member 122 is of elongated configuration with a conical forward end forming an inner annular sealing surface 155 for cooperation with the inner annular valve seat 146 and an outer annular sealing surface 156 for cooperation with the outer annular valve seat 148, both of the sealing surfaces being of conical configuration. The valve member 122 is formed with an axial bore 158 and two lateral bores 160 which place the rearward valve compartment 140 in communication with the inner annular valve seat 146. Preferably, but not necessarily, the forward valve body section 115 is formed with an axial recess 162 in alignment with the axial bore 158.

It is apparent that this arrangement provides an anular flow path for oxidizer fluid to flow through the forward valve compartment 138 around the periphery of the valve member to the outer circumference of the outer annular valve seat 148. The fluid fuel from the supply tube 145 flows from the rearward valve compartment 140 through the lateral bores 160 and the axial bore 168 to the inner circumference of the inner annular valve seat 146. The valve member 122 makes simultaneous contact with the two annular valve seats and is self-aligning in that the two supporting diaphragms 124 and 126 permit the valve member to accommodate itself accurately to the two valve seats.

The dual valve member 120 may be operated by a torque motor 164 in the manner heretofore described, the torque motor being of the same construction as the first described torque motor and being provided with the usual coil spring 92 to supply the force for closing the dual valve. The dual valve member 122 is connected to the armature 88 of the torque motor 164 by a pull rod 166.

A feature of this second embodiment of the invention is that the valve member 122 and the surrounding structure of the forward valve compartment 138 cooperate to meter the flow of the oxidizer fluid to keep this flow constant throughout the range of open positions of the valve member. For this purpose either a longitudinal portion of the valve member or a longitudinal portion of the surrounding valve compartment may be of uniform cross section. In the present construction the valve member 122 has a longitudinal portion 168 of uniform outside diameter and the surrounding structure of the forward valve compartment 138 has a corresponding longitudinal portion 170 of uniform inside diameter. These two longitudinal portions are closely spaced to form an annular metering passage which is of substantially uniform length throughout the relatively short range of longitudinal movement of the valve member to make the flow rate of the oxidizer constant. The longitudinal portion 170 of the valve chamber structure is preferably provided by a ring 174 which may be omitted if the metering action is not desired.

It is apparent that since the flow of the oxidizer is constant throughout the range of positions of the valve member 122 and since the rate of flow o fthe fuel past the inner valve seat 146 varies with the position of the valve member 122, the ratio of the rate of fuel flow to the rate of oxidizer flow varies with the extent to which the valve member 122 is retracted from its closed position by energization of the torque motor 164. Consequently, the ratio between the rates of fuel flow and oxidizer flow may be adjusted by adjusting the point of connection of the pull rod 166 with the torque motor armature 88 to vary the degree to which the valve member 122 is retracted by the torque motor. Shifting the point of connection changes the effective length of the pull rod 166, i.e. the distance between the points of connection of the pull rod with the valve member and the torque motor armature.

In this particular embodiment of the invention the torque motor 164 has an operating stroke of .010 inch and is therefore capable of retracting the valve member 122 to the same extent. The stroke of the torque motor may be reduced simply by adjusting the connection of the pull rod 166 relative to the motor armature 88 in such manner that the valve member at its closed position keeps the armature from returning to its normal starting position when the torque motor is de-energized. Thus, increasing the effective length of the pull rod 166 advances the starting position of the armature 88 towards the limit position the armature takes when the torque motor is energized.

To provide for adjustment by fine increments of the operative connection between the pull rod 166 and the armature 88, a tubular differential screw 176 may be used with advantage. The outer circumferential thread of the differential screw 176 engages an inner circumferential thread in a bore in the armature 88 and the inner circumferential thread of the differential screw engages a screw thread on the end portion of the pull rod 166. The outer circumferential and the inner circumferential screw threads of the differential screw 176 are of different pitch so that rotation of the differential screw shifts the connection between the pull rod and the armature in accord with the pitch difference. It is apparent that screwing the differential screw 176 in the direction away from the valve member 122 reduces the effective stroke of the torque motor 164 and correspondingly reduces the ratio between the rates of fuel and oxidizer flow. A suitable lock nut 180 releasably maintains the differential screw adjustment.

My description in specific detail of the two embodiments of the invention will suggest various changes, substitutions and other departures from my disclosure within the spirit and scope of the appended claims.

I claim:

1. Valve means for close control of the injection of two fluids from two supplies into a combustion chamber, comprising:

a valve chamber having two concentric annular valve seats at one end and being ported for discharge between the two valve seats, the surfaces of said valve seats being perpendicular to the axis of the chamber, said chamber having two inlet ports adapted for connection to said two supplies respectively;

a valve member in said valve chamber having two annular portions on one end for simultaneous cooperation with said two valve seats respectively, said valve chamber and valve member forming two compartments in communication with said two supplies, respectively, said two compartments being sealed off from each other, one of said compartments extending to the outer circumference of the outer annular valve seat;

said valve member having a passage therethrough for fluid communication from the other compartment to the inner circumference of the inner annular valve seat;

means to actuate said valve member; and a cylindrical baffle extending forward from the valve member into said annular discharge port to separate the two fluids.

2. Valve means for close control of the injection of two fluids from two supplies into a combustion chamber, comprising:

a valve chamber having a discharge port at one end adapted for delivering the two fluids to the combustion chamber and having two inlet ports adapted for connection to said two supplies respectively, said valve chamber having a first stationary valve seat between said discharge port and one of said inlet ports and a second stationary valve seat between the discharge port and the other of said inlet ports;

a valve member inside said chamber extending longitudinally thereof and having two portions positioned relative to said two valve seats for simultaneous cooperation with the two valve seats; and a pair of sealing means spaced apart longitudinally of the valve member and extending from the valve member to the surrounding wall of the chamber, said pair of sealing means forming with said chamber and valve member two separate compartments surrounding the valve member in communication with said two inlet ports respectively, one of said compartments lying between the two sealing means, one of said compartments extending to one of said valve seats, said valve member having a passage therethrough for fluid communication from the other of said compartments to the other of said valve seats.

3. Valve means for close control of the injection of two fluids from two supplies in a combustion chamber, comprising:
   a valve chamber having two inlet ports adapted for connection with the two supplies respectively, and having two concentric annular valve seats facing in one axial direction, said valve chamber being ported for discharge between the two valve seats;
   a valve member with a leading portion formed with two concentric annular sealing surfaces facing in the opposite axial direction for simultaneous cooperation with said two valve seats;
   sealing means forming with the valve member and the valve chamber, two valve compartments in communication with said two inlet ports respectively,
   one of said compartments communicating with one of said two valve seats,
   said valve member having a passage therethrough from the other compartment to the other valve seat; and
   means yieldingly supporting said leading portion of the valve member to give the leading portion freedom for alignment with the two valve seats.

4. A combination as set for in claim 3 in which
   said valve member comprises a plurality of sections including a leading section constituting said leading portion and including an adjacent section,
   said two sections being yieldingly interconnected by resilient radial means with one section connected directly to a radially outward portion of the radial means and the other section connected directly to a radially inward portion of the radial means.

5. A combination as set forth in claim 3 in which
   said valve member comprises a plurality of sections including a leading section constituting said leading portion and including an adjacent section,
   said two sections being yieldingly interconnected,
   said two sections having mating spherically curved surfaces forming an articulated joint between the two sections.

6. Valve means for close control of the injection of two fluids from two supplies into a combustion chamber, comprising:
   a valve chamber having a portion ported for discharge of the two fluids to the combustion chamber,
   said ported portion being located between an inner circumference and an outer circumference,
   said valve chamber having a stationary first annular valve seat outside said outer circumference and a stationary second annular valve seat inside said inner circumference;
   a valve member in said valve chamber having two annular portions positioned for simultaneous sealing contact with the two valve seats, respectively, said valve member having a passage therethrough;
   a pair of spaced diaphragms surrounding the valve member in the valve chamber and supporting the valve member to keep the valve member centered with respect to the two valve seats and to flex to permit axial movement of the valve member relative to the two valve seats, the two diaphragms being connected to the valve member at axially spaced points and also being connected to the wall of the chamber surrounding the valve member,
   one of said diaphragms cooperating with the valve chamber and the value member to form a first compartment around the valve member in communication with one of the two supplies and in communication with said first valve seat, the two diaphragms cooperating with the valve member and the chamber to form a second compartment around the valve member in communication with the other of the two fluid supplies and in communication with said passage of the valve member for fluid flow from the second compartment to the second valve seat; and
   actuating means operatively connected to the valve member for axial movement thereof.

7. A combination as set forth in claim 6 in which said actuating means is a fast-acting remotely controlled electromagnetic means.

8. A combination as set forth in claim 6 in which said two diaphragms are bellows-type diaphragms.

9. A combination as set forth in claim 6 in which the surfaces of said valve seats are perpendicular to the axis of the valve member and the valve member has corresponding surfaces perpendicular to its axis for cooperation with the two valve seats.

10. A combination as set forth in claim 9 in which the valve chamber has an annular discharge port between the two valve seats concentrically thereof which discharge port has radially spaced concentric walls; and
    in which a cylindrical baffle extends from the valve member into the annular discharge port.

11. A combination as set forth in claim 6 in which the two valve seats surround the valve member and in which longitudinal spaced portions of the outer circumferential surface of the valve member are shaped and dimensioned for simultaneous contact with the two valve seats.

12. A combination as set forth in claim 6 in which one of said compartments is formed in part by cooperating longitudinal portions of the chamber and the valve member respectively, at least one of said longitudinal portions being of uniform cross section to make the flow through the compartment substantially constant through the range of positions of the valve member whereby the ratio between the rates of flow through the two compartments varies with the position of the valve member.

13. A combination as set forth in claim 12 in which both of said longitudinal portions are of uniform cross section.

14. A combination as set forth in claim 6 in which said two valve seats are tapered and
    in which said annular portions of the valve member are correspondingly tapered.

References Cited by the Examiner

UNITED STATES PATENTS

| | | | |
|---|---|---|---|
| 1,393,090 | 10/1921 | Cowardin | 239—408 XR |
| 2,260,987 | 10/1941 | D'Arcy | 239—412 |
| 2,810,259 | 10/1957 | Burdett | 60—35.6 |
| 2,870,603 | 1/1959 | Long | 60—35.6 |
| 3,043,324 | 7/1962 | Morgan | 137—87 |
| 3,058,038 | 10/1962 | Steedman | 251—129 XR |
| 3,064,903 | 11/1962 | Butler | 60—35.6 XR |
| 3,074,231 | 1/1963 | Klein | 60—35.6 |
| 3,105,671 | 10/1963 | Teitelbaum | 251—30 |

M. CARY NELSON, *Primary Examiner.*

MARTIN P. SCHWADRON, *Examiner.*